(12) United States Patent
Inari et al.

(10) Patent No.: US 6,692,067 B2
(45) Date of Patent: Feb. 17, 2004

(54) ASSIST GRIP

(75) Inventors: Takahiko Inari, Toyota (JP); Ryuji Ohtsuka, Toyota (JP)

(73) Assignee: Nifco, Inc., Yokohama (JP)

( * ) Notice: Subject to any disclaimer, the term of this patent is extended or adjusted under 35 U.S.C. 154(b) by 0 days.

(21) Appl. No.: 10/067,541

(22) Filed: Feb. 7, 2002

(65) Prior Publication Data

US 2002/0113465 A1 Aug. 22, 2002

(30) Foreign Application Priority Data

Feb. 22, 2001 (JP) ........................................ 2001-046246

(51) Int. Cl.⁷ ................................................. B60R 7/10
(52) U.S. Cl. ...................................... 296/214; 224/313
(58) Field of Search ............................ 296/214; 16/438, 16/444, 445; 224/268, 313

(56) References Cited

U.S. PATENT DOCUMENTS

| | | | | |
|---|---|---|---|---|
| 4,720,028 A | * | 1/1988 | Takemura et al. | 224/42.45 A |
| 4,981,323 A | * | 1/1991 | Dowd et al. | 296/214 |
| D327,865 S | * | 7/1992 | Falcoff et al. | D12/155 |
| 5,366,127 A | | 11/1994 | Heinz | |
| 5,507,423 A | * | 4/1996 | Fischer et al. | 224/313 |
| 6,076,233 A | * | 6/2000 | Sasaki et al. | 16/444 |
| 6,095,469 A | * | 8/2000 | Von Alman | 248/304 |
| 6,397,435 B1 | * | 6/2002 | Gosselet | 16/438 |
| 6,422,524 B1 | * | 7/2002 | Spagnuolo et al. | 248/307 |
| 6,447,055 B1 | * | 9/2002 | Mainville et al. | 296/214 |
| 2003/0141423 A1 | * | 7/2003 | Gordon | 248/304 |

FOREIGN PATENT DOCUMENTS

JP       7-291006       11/1995

* cited by examiner

Primary Examiner—D. Glenn Dayoan
Assistant Examiner—H. Gutman
(74) Attorney, Agent, or Firm—Kanesaka & Takeuchi

(57) ABSTRACT

A grip main portion of an assist grip is attached to a car body through an attaching device. A hook member is housed in a housing of the attaching device to be located outside the housing. An end surface of the hook member is aligned with an outer surface of the attaching device in a state wherein the hook member is housed in the housing. The housing and the hook member are provided with a cam mechanism. Through the cam mechanism, the hook member can be moved between a using position and a non-using position. Thus, the assist grip having a good appearance and operability can be obtained.

7 Claims, 17 Drawing Sheets

ASSIST GRIP

BACKGROUND OF THE INVENTION AND RELATED ART STATEMENT

The invention relates, to an assist grip attached to a compartment of an automobile and held by a passenger.

Examples of conventional assist grips are shown in FIGS. 16 to 17(B). In both cases, Japanese Patent Publication (KOKAI) No. 7-291006 is referred to.

In an assist grip 312 as shown in FIG. 16, a grip main portion (not shown) to be held by a passenger is engaged with a first attaching base portion 314. The first attaching base portion 314 includes a hook portion 316, and a hanger can be hung on a hanging portion 318 of the hook portion 316.

However, since the hook portion 316 is integrally projected from the first attaching base portion 314, even when the hook portion 316 is not used, it protrudes into a compartment, stands to cause a trouble, or inadvertently contacts other things. Also, the hook portion 316 protrudes from the first attaching base portion 314, which does not make the outer appearance look better.

On the contrary, in an assist grip 332 as shown in FIGS. 17(A) and 17(B), a hook portion 336 is assembled to a first attaching base portion 334, and a hanging portion 338 of the hook portion 336 is collapsibly assembled with respect to a box-like portion 340. Therefore, in case a hanger is hung on the hanging portion 338, as shown in FIG. 17(B), the hanging portion 338 is turned, and when the hanger is not hung thereon, as shown in FIG. 17(A), the hanging portion 338 is raised. Thus, the hanging portion 338 does not protrude into the compartment. Also, in the state wherein the hanging portion 338 is raised, a side surface of the hanging portion 338 and a side surface of the box-like portion 340 contact each other, and the hanging portion 338 is engaged therewith by the frictional resistance between the side surfaces.

However, in case the friction between the side surfaces of the hanging portion 338 and the box-like portion 340 is small, the hanging portion 338 may be moved or wobbled while the automobile is running. In order to prevent the wobbling, it is considered that the friction is increased. However, when the friction is increased, the resistance when the hanging portion 338 is turned or raised is also increased, which results in poor operability.

Moreover, in the assist grip 332, also, the hanging portion 338 always protrudes from the first attaching base portion 334, which does not make its outer appearance look better as in the assist grip 312 shown in FIG. 16.

In order to solve the above defects, the present invention has been made and an object of the present invention is to provide an assist grip which does not stand or become an obstacle when it is not used, and has a good appearance and operability.

Further objects and advantages of the invention will be apparent from the following description of the invention.

SUMMARY OF THE INVENTION

According to one aspect of the present invention, an assist grip includes an attaching device for holding a grip main portion which a passenger holds and to be attached to a car body; a hanging member provided to be movable between a using position projected from the attaching device and a non-using position retreated from the using position with respect to the attaching device; and a fixing device for fixing the hanging member at the non-using position with respect to the attaching device.

In the assist grip, the grip main portion is attached to a car body through the attaching device so that a passenger can grip the grip main portion.

The hanging member is attached to the attaching device to be movable between the using position and the non-using position. Since a member to be hung can be hung on the hanging member at the using position, the member to be hung, for example, a hanger can be hung thereon.

The hanging member is retreated toward the attaching device at the non-using position to thereby not project from the attaching device, or if projected, the projecting quantity is very small. Thus, the hanging member does not become an obstacle at the non-using time, and has a good appearance.

Also, the hanging member is fixed to the attaching device at the non-using position by a fixing device to thereby prevent the hanging member from being inadvertently wobbled. Also, since the friction as used in the prior art is not used to fix the hanging member to the attaching device, large resistance due to the friction does not act when the hanging member is moved between the using position and the non-using position. Thus, good operability can be obtained.

When fixing by the fixing device is released, the hanging member can be moved from the non-using position to the using position.

In the first aspect of the invention, while a specific structure when the hanging member is moved between the using position and the non-using position is not specially limited, for example, as in the second aspect of the invention, the hanging member may slide with respect to the attaching device so that the hanging member can be moved between the using position and the non-using position; or, as in the third aspect of the invention, the hanging member may be rotated with respect to the attaching device so that the hanging member can be moved between the using position and the non-using position.

According to the fourth aspect of the invention, the fixing device allows the hanging member to be fixed to the attaching device or allows the hanging member to be released therefrom through the movement of the hanging member toward the non-using position.

Thus, fixing of the hanging member and releasing thereof can be carried out through the fixing device by only moving the hanging member toward the non-using position thus obtaining good operability.

As the fixing device, for example, a cam mechanism having a hart cam may be employed. Through the mechanism, since the hanging member is moved between the using position and the non-using position by a push-push operation, the operability can be further improved.

According to the fifth aspect of the invention, a housing for receiving the hanging member to be movable therein is integrally attached to the attaching member.

As described above, since the housing is provided, the hanging member is guided by the housing to smoothly move.

Also, since the housing is integrally formed with the attaching device, the number of parts is not increased.

BRIEF DESCRIPTION OF THE DRAWINGS

FIGS. 17(A) and 17(B) are partial perspective views of another conventional assist grip, wherein FIG. 17(A) shows a state that a hook portion is located in the non-using position, and FIG. 17(B) shows a state that the hook portion is located in the using position.

DETAILED DESCRIPTION OF PREFERRED EMBODIMENTS

Figure 1:
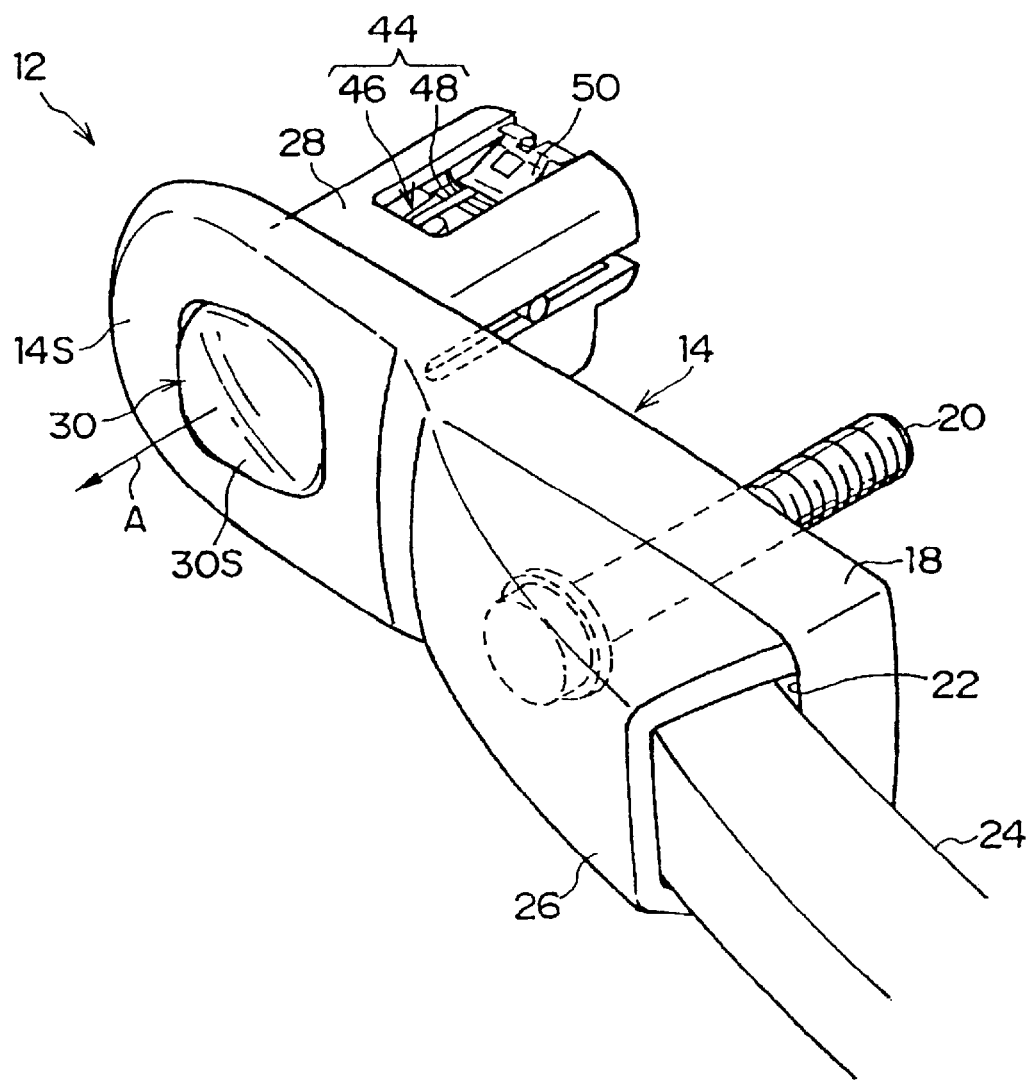
FIG. 1 is a partial perspective view of an assist grip of the first embodiment according to the present invention, wherein a hook member is located at a non-using position.
Figure 2:
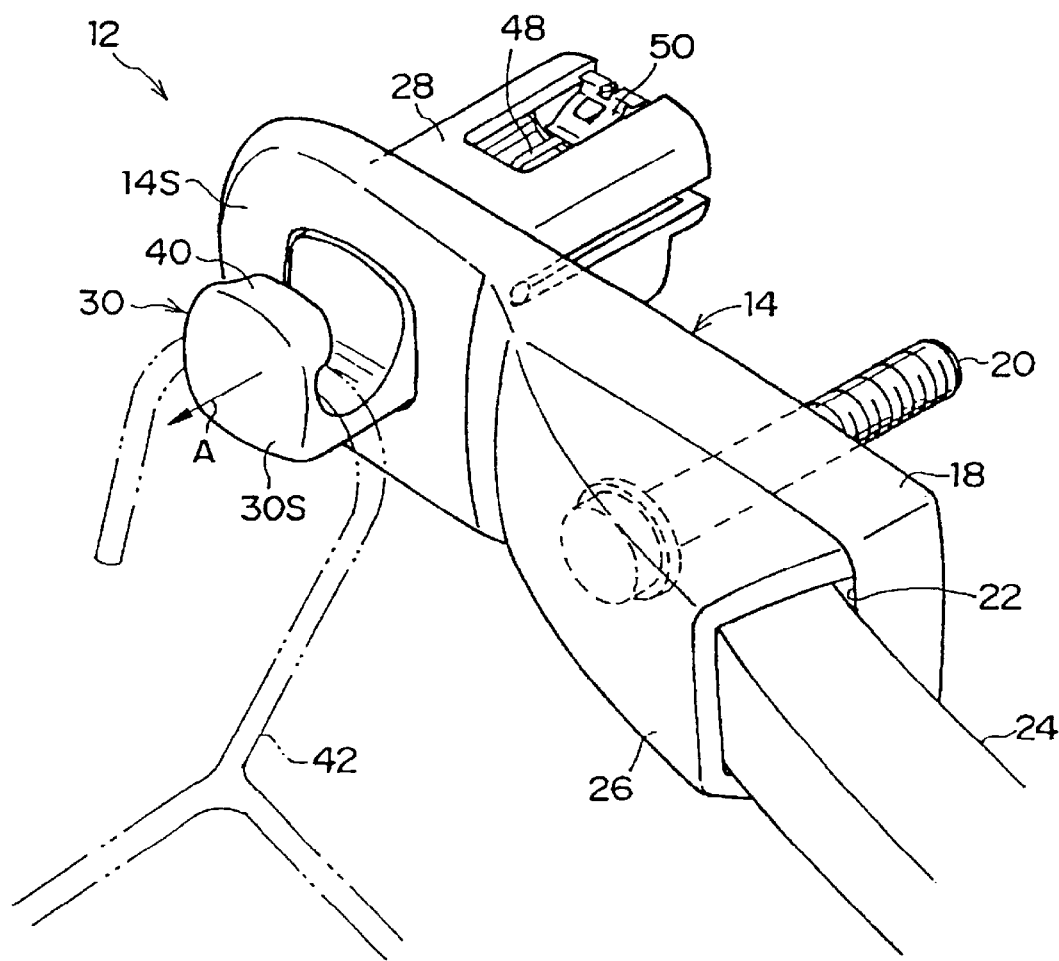
FIG. 2 is a partial perspective view of the assist grip of the first embodiment according to the present invention, wherein the hook member is located at a using position.
Figure 3:
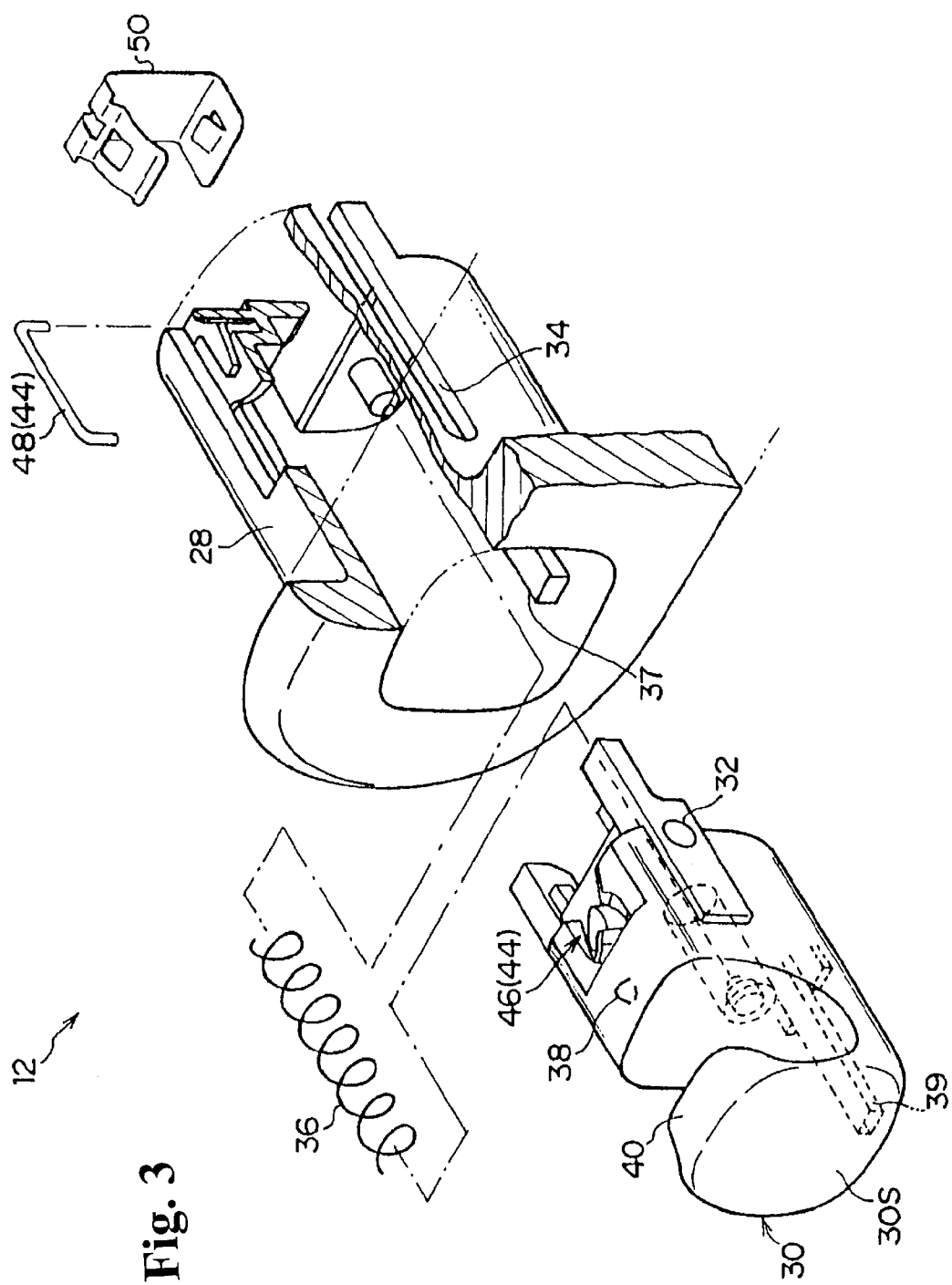
FIG. 3 is a partial exploded perspective view showing the assist grip of the first embodiment.
Figure 4:
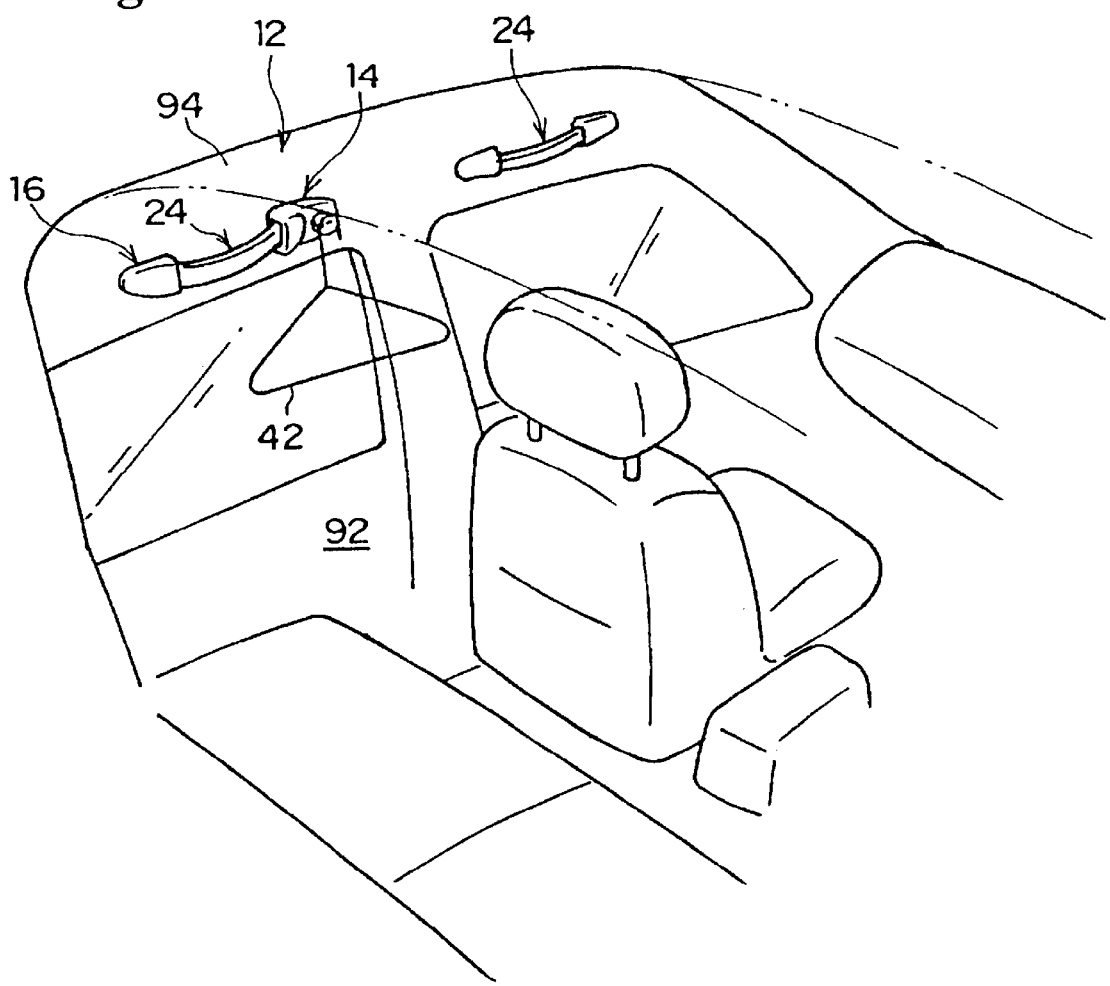
FIG. 4 is a perspective view showing an interior of an automobile, wherein the assist grip of the first embodiment is attached.

FIGS. 1 and 2 show partial perspective views and FIG. 3 is an exploded partial perspective view, of an assist grip 12 of a first embodiment according to the present invention. FIG. 4 is a perspective view of an interior of a compartment 92 of an automobile, wherein the assist grips 12 are provided. As can be seen from FIG. 4, the assist grips 12, for example, are attached to a roof rail 94 of a car body, so that the sitting persons, i.e. passengers, on a front seat and a rear seat can hold them. However, the attaching position is not limited thereto.

As shown in FIG. 4, the assist grip 12 includes a pair of attaching members 14, 16. In the attaching members 14, 16, an attaching portion 18 is formed. An attaching bolt 20 is inserted into an attaching hole, not shown, formed on each attaching portion 18, and is further screwed in a panel of the roof rail 94 to thereby attach the attaching members 14, 16 to a car body.

The respective attaching members 14, 16 include holding portions 22 on their facing sides, and both edges of a grip main portion 24 are held by the respective holding portions 22. The grip main portion 24 is made of, for example, a flexible resin and is formed to be curved in an arc shape, so that the central portion of the grip main portion 24 held by the attaching portions 14, 16 is lifted from the car body. The passenger can hold the central portion thereof.

Incidentally, the specific structure for holding the grip main portion 24 by the attaching members 14, 16 is not limited. For example, it is considered that after the attaching bolts 20 are inserted into the attaching holes provided in the vicinity of both edges of the grip main portion 24, respectively, the attaching members 14, 16 are attached to the car body, so that it is possible to carry out holding of the grip main portion 24 and attachment of the attaching members 14, 16 to the car body at the same time to thereby improve its workability.

As described above, in a state where the attaching members 14, 16 are attached to the car body by the attaching bolts 20 and the grip main portion 24 is held thereby, the attaching bolts 20 and the edge portions of the grip main portion 24 are covered by the covers 26 to thereby make the outer appearance look better.

A housing 28 projecting toward the car body side, i.e. a side opposite to the compartment, in a state where the housing 28 is attached to the car body, is formed at at least one of the attaching members 14, 16. Although the housing 28 is attached to only the attaching member 14 in the present embodiment, the housings may be attached to both of them, respectively. As can be seen from FIG. 3, the housing 28 opens toward the compartment and the opposite side thereof is formed to be a partially closed cylinder, so that a hook member 30 is housed therein to slide in an arrow A direction and in an opposite direction thereto.

The hook member 30 is formed with a predetermined length so that an edge surface 30S thereof is aligned with an outer surface 14S of the attaching member 14 when the hook member 30 is received in the housing 28 (refer to FIGS. 1 and 5), and the hook member 30 sufficiently projects from the outer surface 14S, described later, (refer to FIGS. 2 and 6) when it is used.

Figure 5:
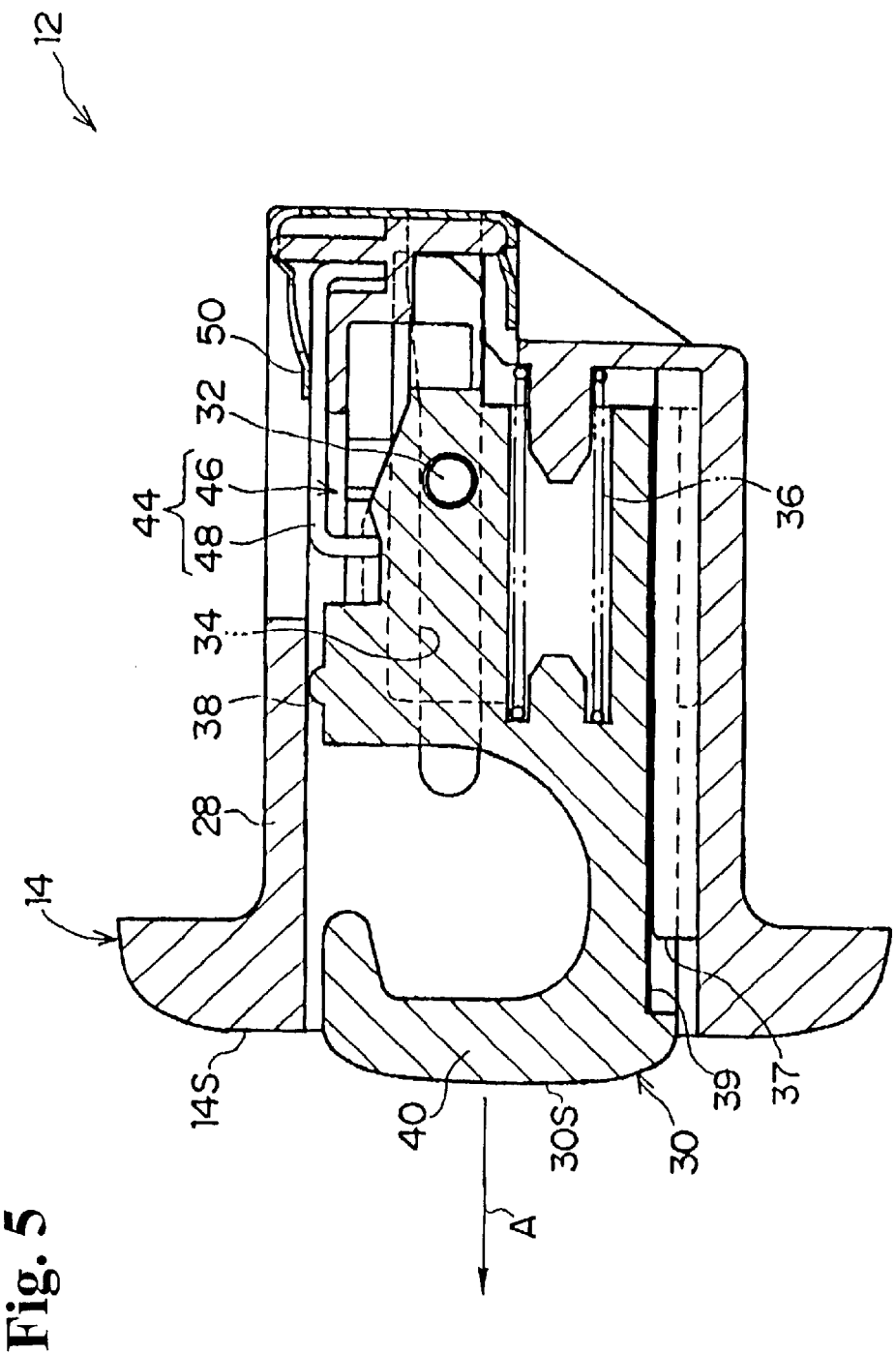
FIG. 5 is a partial sectional view of the assist grip of the first embodiment, wherein the hook member is located at the non-using position.
Figure 6:
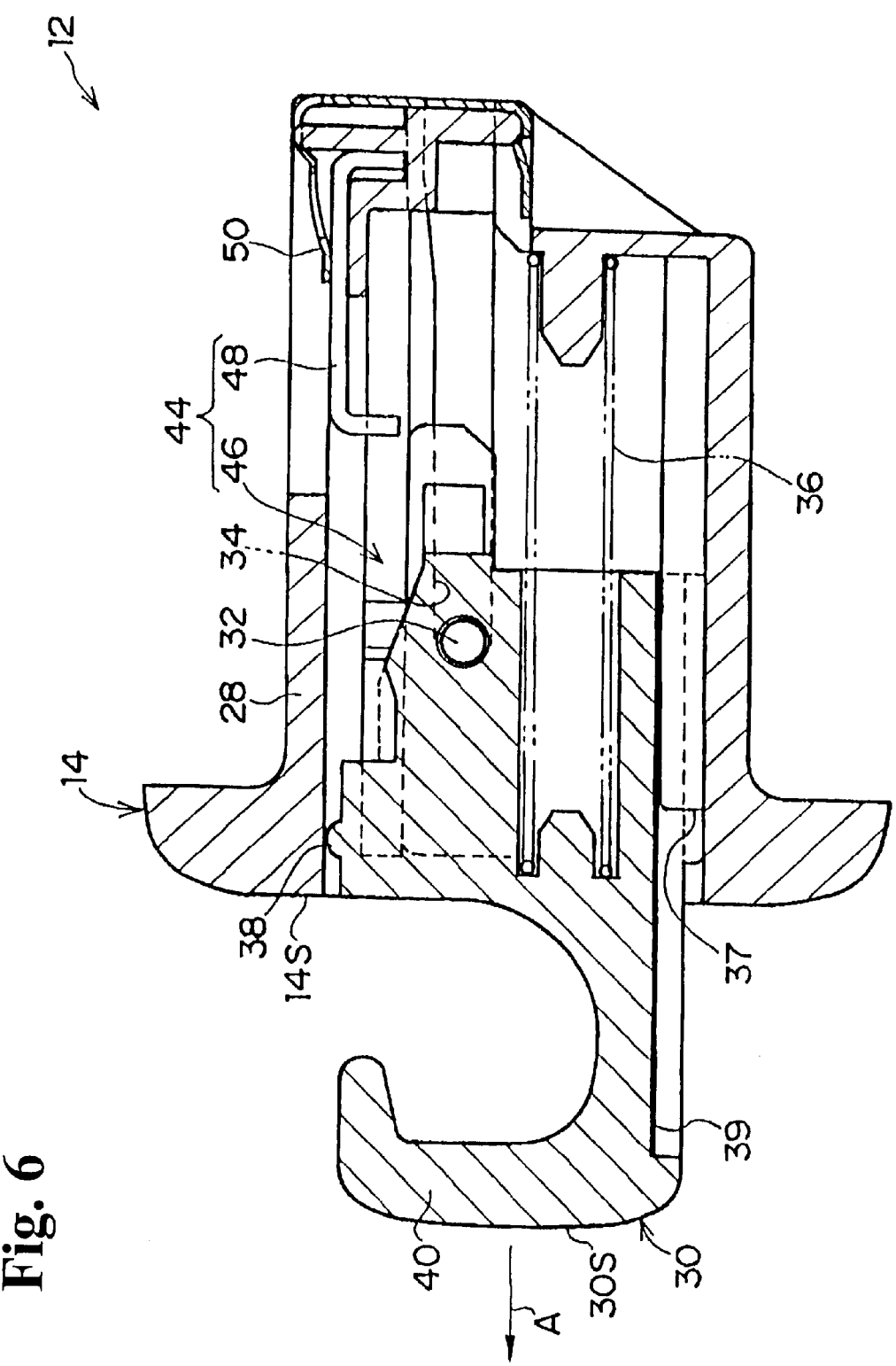
FIG. 6 is a partial sectional view of the assist grip of the first embodiment, wherein the hook member is located at the using position.

As shown in FIGS. 3, 5 and 6, a guiding pin or member 32 projects from a side surface of the hook member 30 and is moved in a guiding groove 34 formed on an inner surface of the housing 28, so that the hook member is prevented from being wobbled and can slide in the housing 28. Also, since the guiding pin 32 is limited in its moving region by the guiding groove 34, the sliding region of the hook member 30 is also limited. Thus, there is no risk of the hook member 30 coming off the housing 28 inadvertently.

A compressed coil spring 36 is disposed between the hook member 30 and the housing 28, and the hook member 30 is urged toward the compartment, i.e. in the arrow A direction by the compressed coil spring 36.

Further, a sliding projection 38 is provided on an upper surface of the hook member 30, so that the hook member 30 can slide in the housing 28 without wobbling in a vertical direction through the contact of the sliding projection 38 with a top surface of the housing 28. Also, a guiding groove 39 is formed on a lower surface of the hook member 30 to be engaged with a projecting strip 37 formed on a bottom surface of the housing 28. Thus, the hook member 30 can slide in the housing 28 without wobbling in the vertical direction.

A hanging piece 40 in a hook shape is formed near the forward end, i.e. the end on the inner side of the compartment, of the hook member 30. As shown in FIGS. 2 and 4, a member to be hung, such as a hanger 42, can be hung on the hanging piece 40.

A cam pin 48 is provided to project in the housing 28, and a hart cam 46 corresponding to the cam pin 48 is formed on the hook member 30. A cam mechanism 44, which is a fixing device of the present invention, is formed of the cam pin 48 and the hart cam 46. The cam pin 48 is urged by a plate spring 50 attached in the housing 28 so that the forward end thereof can be engageable with the hart cam 46.

As shown in FIGS. 7(A)–7(F) in detail, the hart cam 46 is formed by notching the upper surface of the hook member 30 in a substantially hart shape and a moving path of the cam pin 48 is formed along the notched portion. The moving locus of the cam pin 48 is shown by single-dotted chain lines T in FIGS. 7(B)–7(F). In a state where the hook member 30 is used, as shown in FIGS. 2 and 6, the forward end side of the hook member 30 is projected from the outer surface of the attaching member 14 upon receipt of an urging force of the compressed coil spring 36, and at this time, the cam pin 48 is relatively located in a position (refer to symbol 48(A)) shown in FIG. 7(A) with respect to the hart cam 46. Here, when a passenger pushes the hook member 30 toward the inside of the housing 28 (i.e. a direction opposite to the arrow A direction in FIGS. 2 and 6), the hook member 30 is moved against the urging force of the compressed coil spring 36 and the hart cam 46 is also moved toward the interior of the housing 28.

Figure 7A:
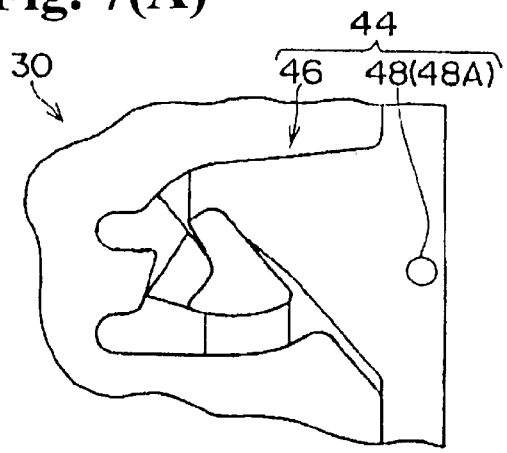
FIGS. 7(A) to 7(F) are explanatory drawings for explaining movements of a driving mechanism provided to the assist grip of the first embodiment of the present invention.
Figure 7D:
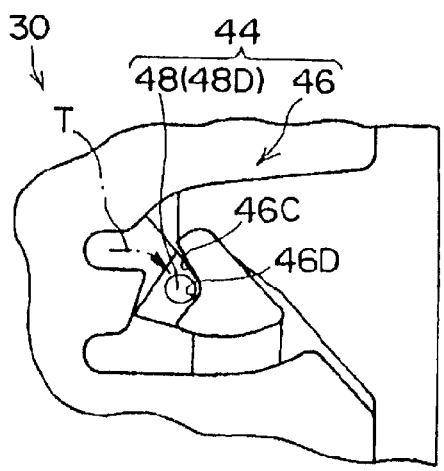
Figure 7B:
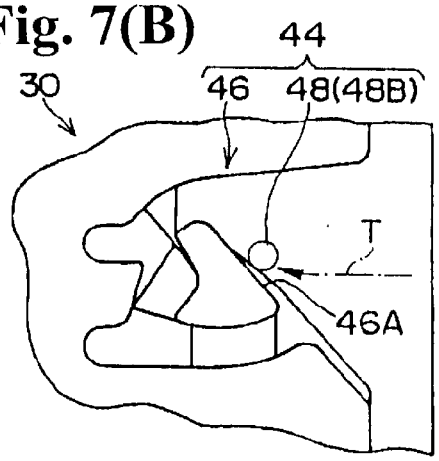
Figure 7E:
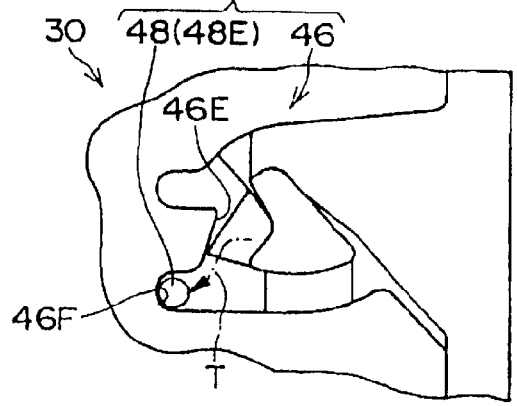
Figure 7C:
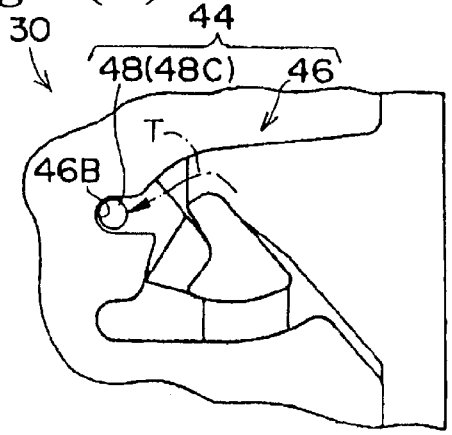
Figure 7F:
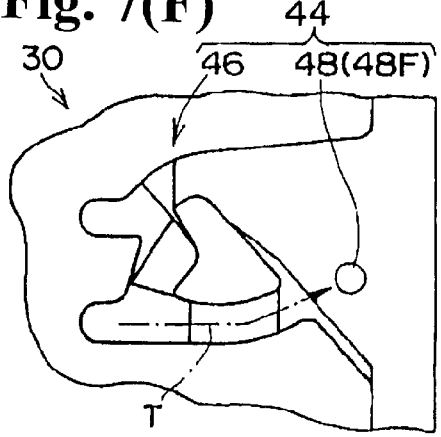

As shown in FIG. 7(B), although a first inclined surface 46A of the hart cam 46 contacts the cam pin 48 (refer to symbol 48B), when the hook member 30 is further pushed, the cam pin 48 is pushed by the first inclined surface 46A to thereby move to the side direction (an upper direction in FIG. 7(B)). When the hart cam 46 is moved further, the cam pin 48 is moved away from the first inclined surface 46A and reaches a first bottom portion 46B (refer to symbol 48C) as shown in FIG. 7(C). Under the state, the movement (movement toward the interior of the housing 28) of the hook member 30 is limited.

When the pressing force against the hook member 30 is released, the hook member 30 is slightly moved in a direction (arrow A direction) projecting from the housing 28 in receipt of the urging force of the compressed coil spring 36. At this time, since the hart cam 46 also moves in the arrow A direction with respect to the cam pin 48, a second inclined surface 46C of the hart cam 46 hits the cam pin 48 to move in the side direction to thereby reach an engaging portion 46D as shown in FIG. 7(D) (refer to symbol 48D). At the engaging portion 46D, since the relative movements of the cam pin 48 and the hart cam 46 in the side direction (direction crossing at right angles to the arrow A) are limited, the cam pin 48 and the engaging portion 48D are pressed against each other by the urging force of the compressed coil spring 36 to thereby fix the hook member 30 at this position. At this time, the hook member 30 is in a non-using state, so that the forward end 30S is substantially aligned with the outer surface 14S of the attaching member 14 as shown in FIGS. 1 and 5.

When the hook member 30 in the non-using state is again pressed toward the interior of the housing 28, the hook member 30 is moved against the urging force of the compressed coil spring 36 and the hart cam 46 is also moved toward the interior of the housing 28. Since a third inclined surface 46E of the hart cam 46 pushes the cam pin 48, the cam pin 48 moves sideways along the third inclined surface 46E. As shown in FIG. 7(E), when the cam pin 48 reaches the second bottom portion 46F (refer to symbol 48E), the hook member 30 does not move further toward the housing 28. When the pressing force against the hook member 30 is released, the hook member 30 is moved in a direction, i.e. arrow A direction projected from the housing 28 upon receipt of the urging force of the compressed coil spring 36. The cam pin 48 is relatively moved along the moving path to reach a position as shown by symbol 48F, and further reaches a position as shown in FIG. 7(A) (refer to symbol 48A). Here, the movement of the hook member 30 is limited by hitting of the guiding pin 32 against the end portion of the guiding groove 34. Under the state, the forward end portion of the hook member 30 is projected from the outer surface 14S of the attaching member 14 to assume the using-state, so that a member to be hung, such as a hanger 42, can be hung on the hanging piece 40 of the hook member 30.

Next, operations of the assist grip 12 of the present embodiment are explained.

As shown in FIGS. 1 and 5, the hook member 30 is housed in the housing 28 in the non-using state, and the end surface 30S of the hook member 30 is substantially aligned with the outer surface 14S of the attaching member 14. Therefore, the hook member 30 neither becomes an obstacle nor is caught by other things, inadvertently. Also, the appearance in the compartment 92 looks better. At this time, the cam pin 48 is located at a position shown by the symbol 48D in FIG. 7(D), and the hook member 30 is fixed at the non-using position so that the hook member 30 does not inadvertently project into the compartment. Therefore, even in case the hook member 30 is subjected to vibrations of the automobile, the hook member 30 neither wobbles nor generates unusual sounds.

When the hook member 30 is used, the passenger pushes the hook member 30 toward the interior of the housing 28. As shown by the symbol 48E in FIG. 7(E), since the cam pin 48 reaches the second bottom portion 46F to release its fixing position, under the state, in case the pressing force of the hook member 30 is released, the hook member 30 is moved in the arrow A direction in receipt of the urging force of the compressed coil spring 36. Then, the guiding pin 32 hits the end of the guiding groove 34 to thereby limit the movement of the hook member 30. At this time, as shown in FIGS. 2 and 6, since the hook member 30 is in the using state and the forward end portion, i.e. hanging piece 40, thereof is projected from the outer surface 14S of the attaching member 14, the member to be hung, such as a hanger, can be hung on the hanging piece 40. When the hook member 30 is changed from its no-using state to its using state, the hook member 30 is simply pushed, which is not accompanied by any friction resistance as in the prior art. Thus, the assist grip of the invention has good operability.

When the hook member 30 is changed to its non-using state, the passenger pushes the hook member 30 toward the interior of the housing 28. Thus, as sequentially shown in FIGS. 7(A)–(C), the cam pin 48 is relatively moved with respect to the hart cam 46 and reaches the first bottom portion 46B. Under the state, when the pushing pressure is released from the hook member 30, the hook member 30 is moved in the arrow A direction in receipt of the urging force of the compressed coil spring 36 and reaches the engaging portion 46D as shown by the symbol 48D in FIG. 7(D), so that the hook member 30 is fixed at the non-using position. Also, the forward end of the hook member 30 is substantially aligned with the outer surface 14S of the attaching member 14. When the hook member 30 is changed to its non-using state, the hook member 30 is also simply pushed, which is not accompanied by any friction resistance as in the prior art. Thus, the assist grip of the invention has good operability.

Especially, in the present embodiment, since a cam mechanism 44 having the hart cam 46 is employed, as apparent from the above description, it is possible to move the hook member 30 between its using position and its non-using position through the pushing-pushing operation. Thus, the assist grip of the invention has good operability.

Figure 8:
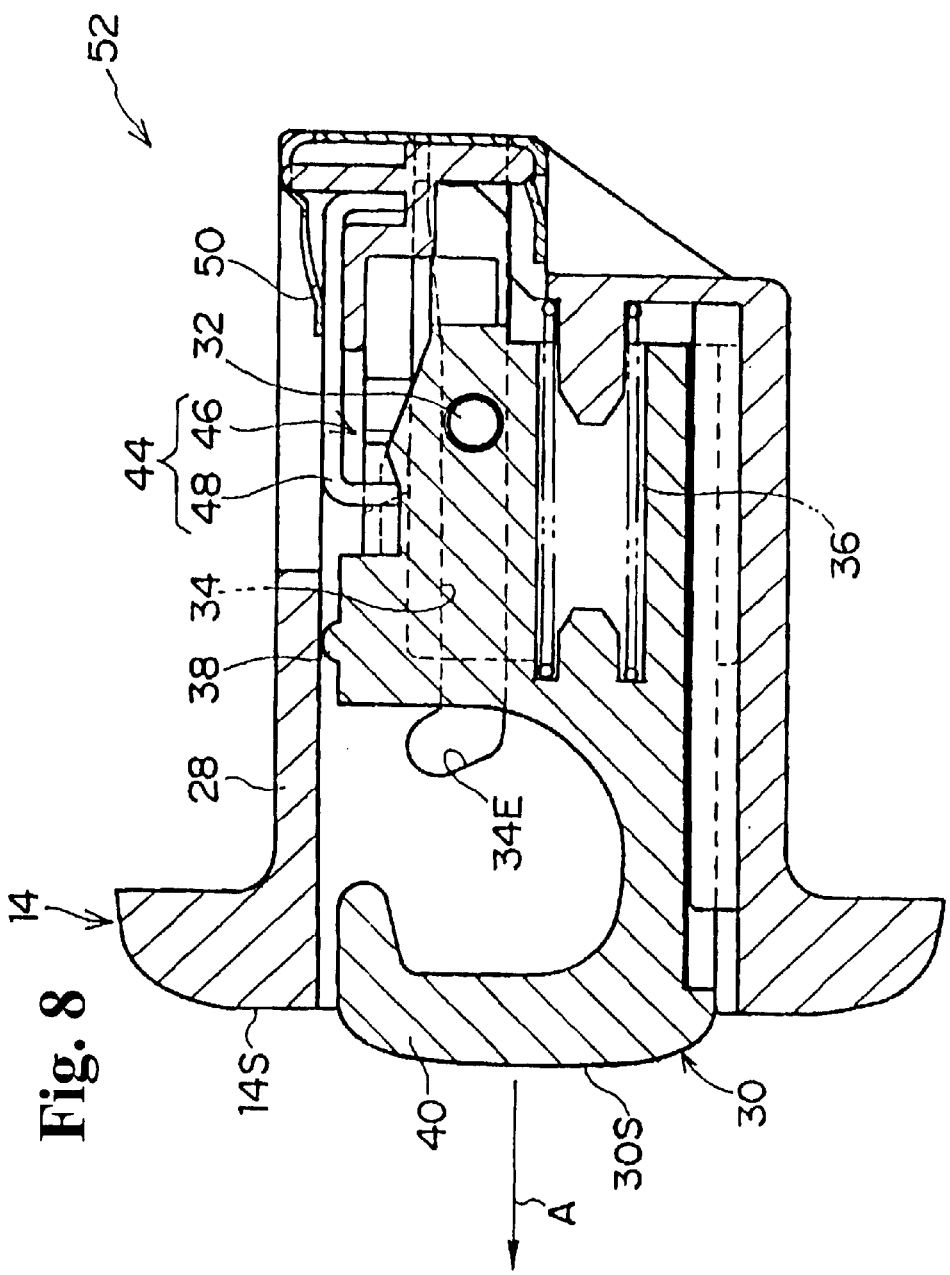
FIG. 8 is a partial sectional view of a modified assist grip of the first embodiment, i.e. the second embodiment, according to the present invention, wherein the hook member is located at the non-using position.
Figure 9:
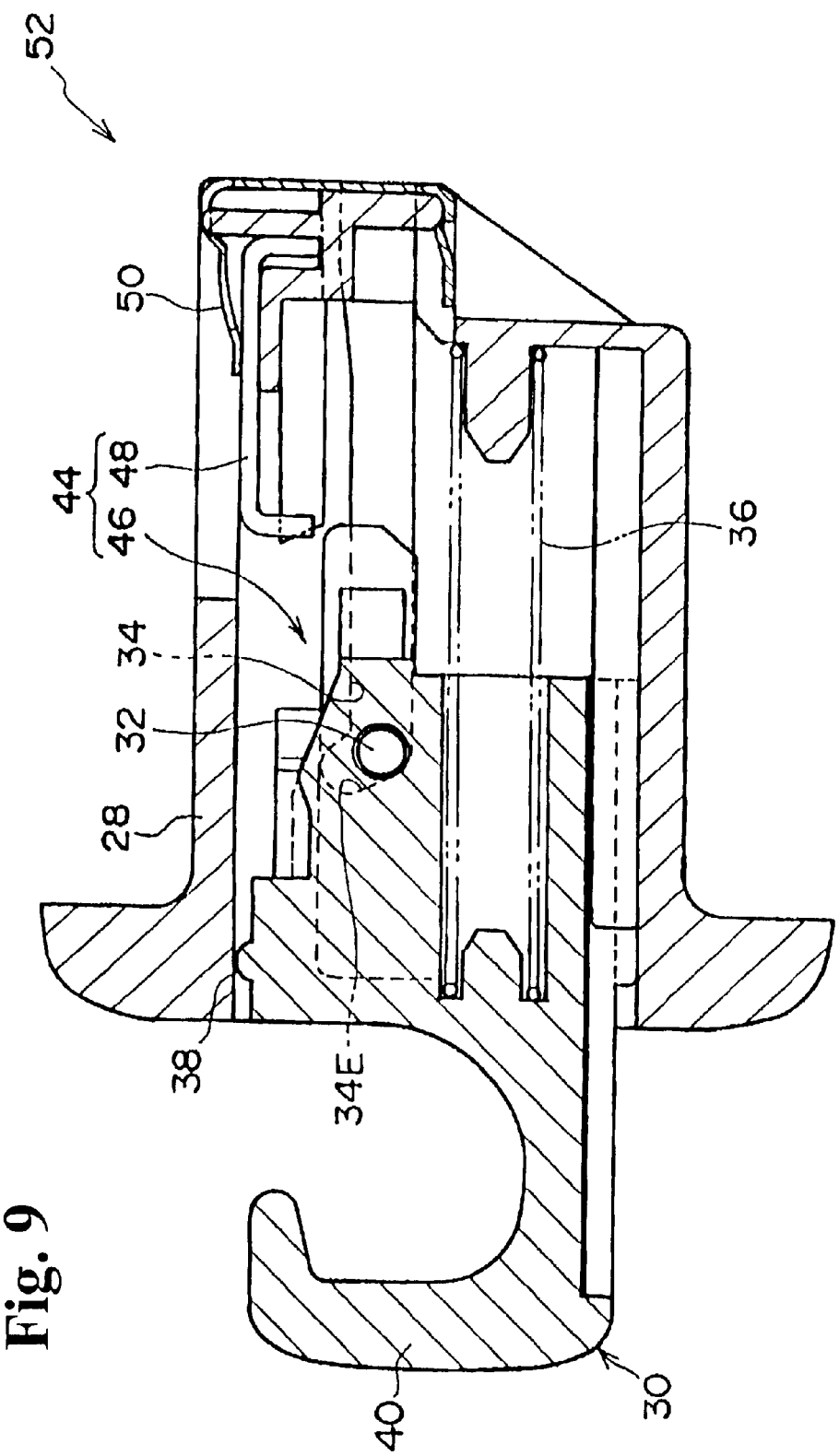
FIG. 9 is a partial sectional view of the second embodiment according to the present invention, wherein the hook member is located at an intermediate position between the non-using position and the using position.
Figure 10:
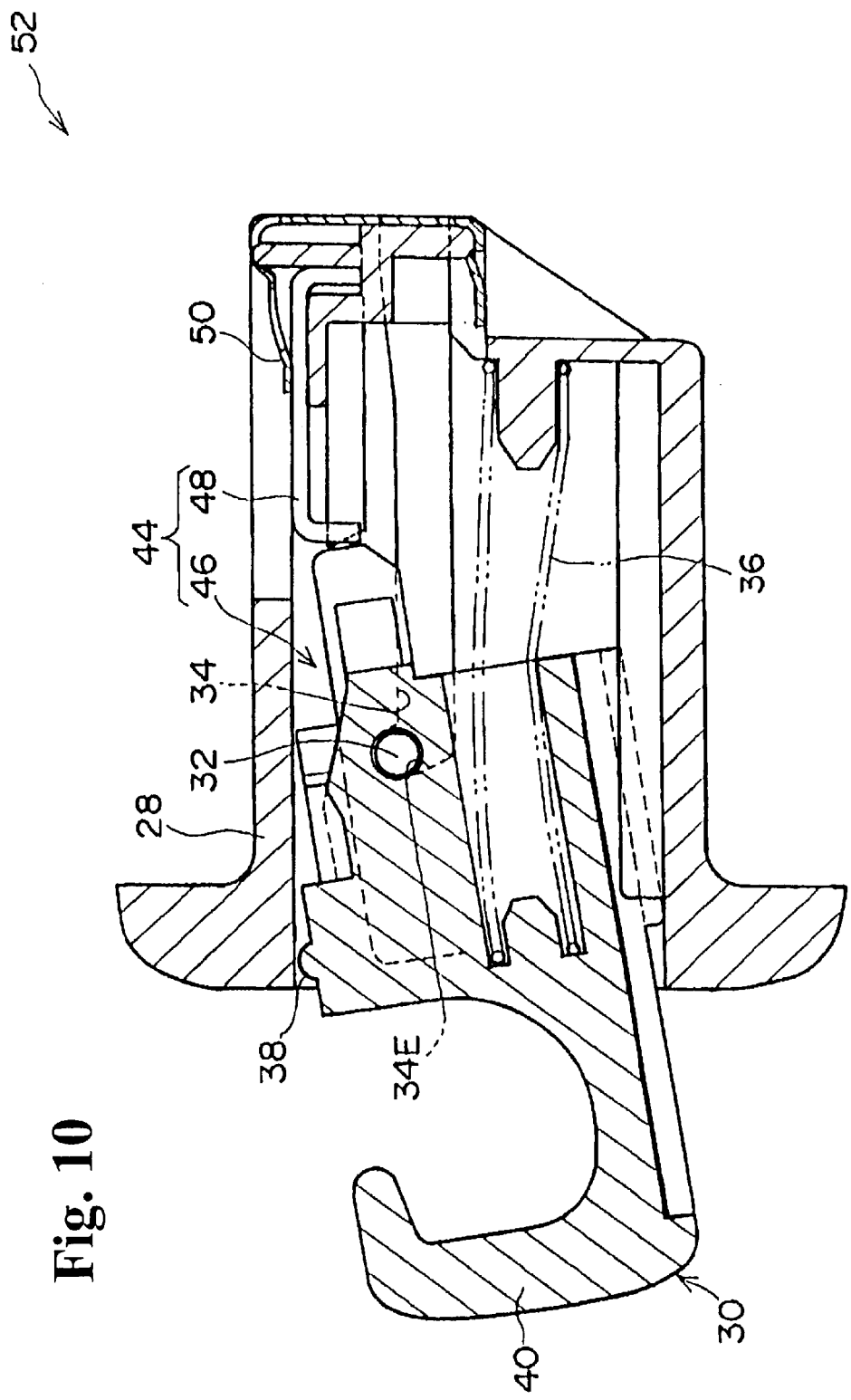
FIG. 10 is a partial sectional view of the second embodiment according to the present invention, wherein the hook member is located at the using position.

FIGS. 8 to 10 are sectional views showing an assist grip 52 of a modified example of the first embodiment, i.e. a second embodiment. In the assist grip 52, a guiding groove 34 is extended toward the compartment 92 (refer to FIG. 4, the left side in FIGS. 8–10). The extended portion 34E is inclined upward, and when the guiding pin 32 reaches the extended portion 34E, the guiding pin 32 is guided obliquely upward. The hook member 30 is moved in the arrow A direction from the non-using position as shown in FIG. 8 and the forward end thereof is projected from the outer surface 14S of the attaching member 14 as shown in FIG. 9. When the guiding pin 32 is further moved upward along the extended portion 34E, the hook member 30 is rotated and the forward end thereof is slightly inclined downward thereby to easily hang the member to be hung, such as a hanger, 42 thereon. Incidentally, the hook member 30 may be rotated by its own weight; or by the weight of the hanger 42 hung thereon. Further, the hook member 30 may be positively rotated by the finger of the passenger.

Figure 11:
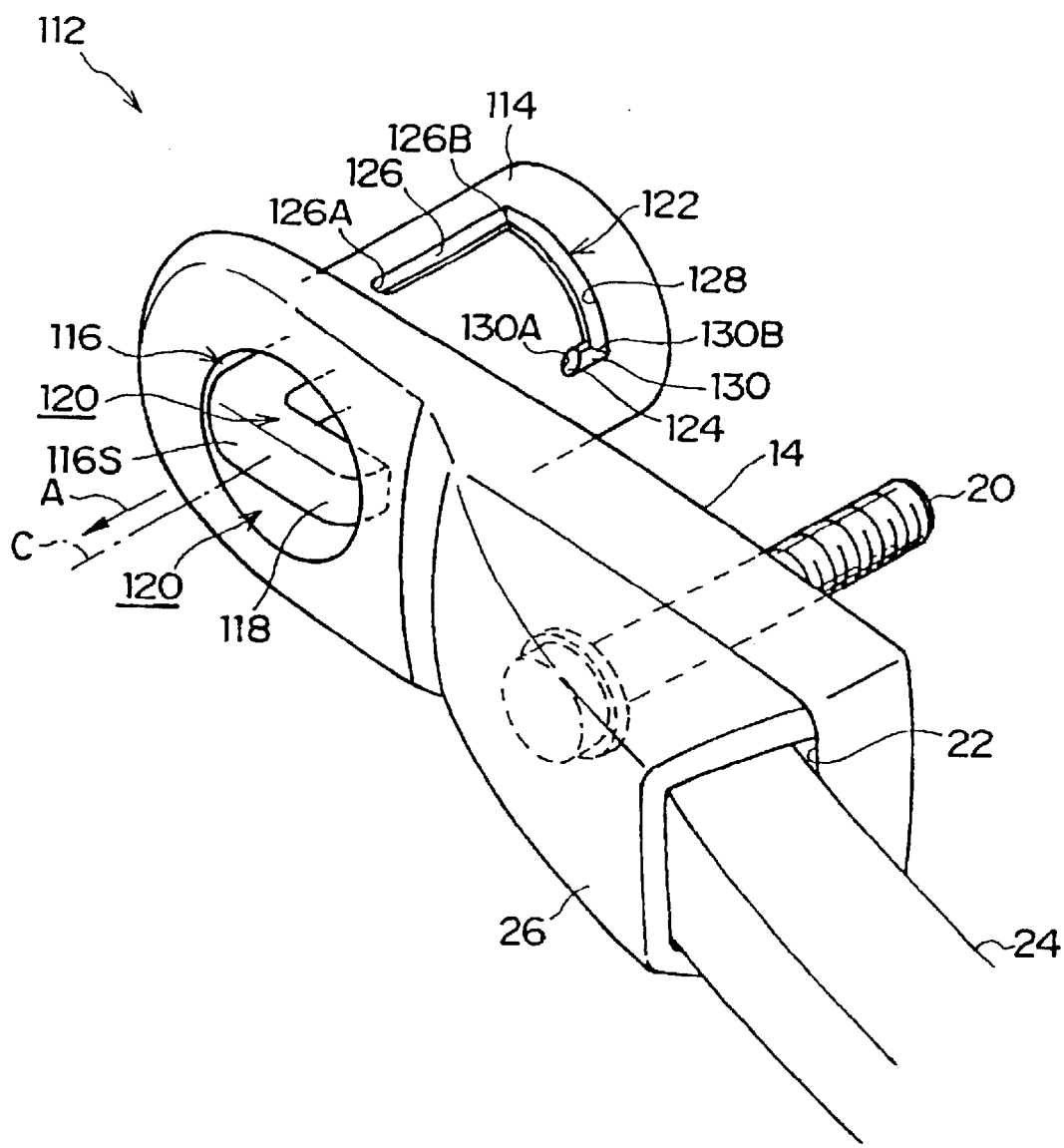
FIG. 11 is a partial perspective view of an assist grip of the third embodiment according to the present invention, wherein the hook member is located at the non-using position.
Figure 12:
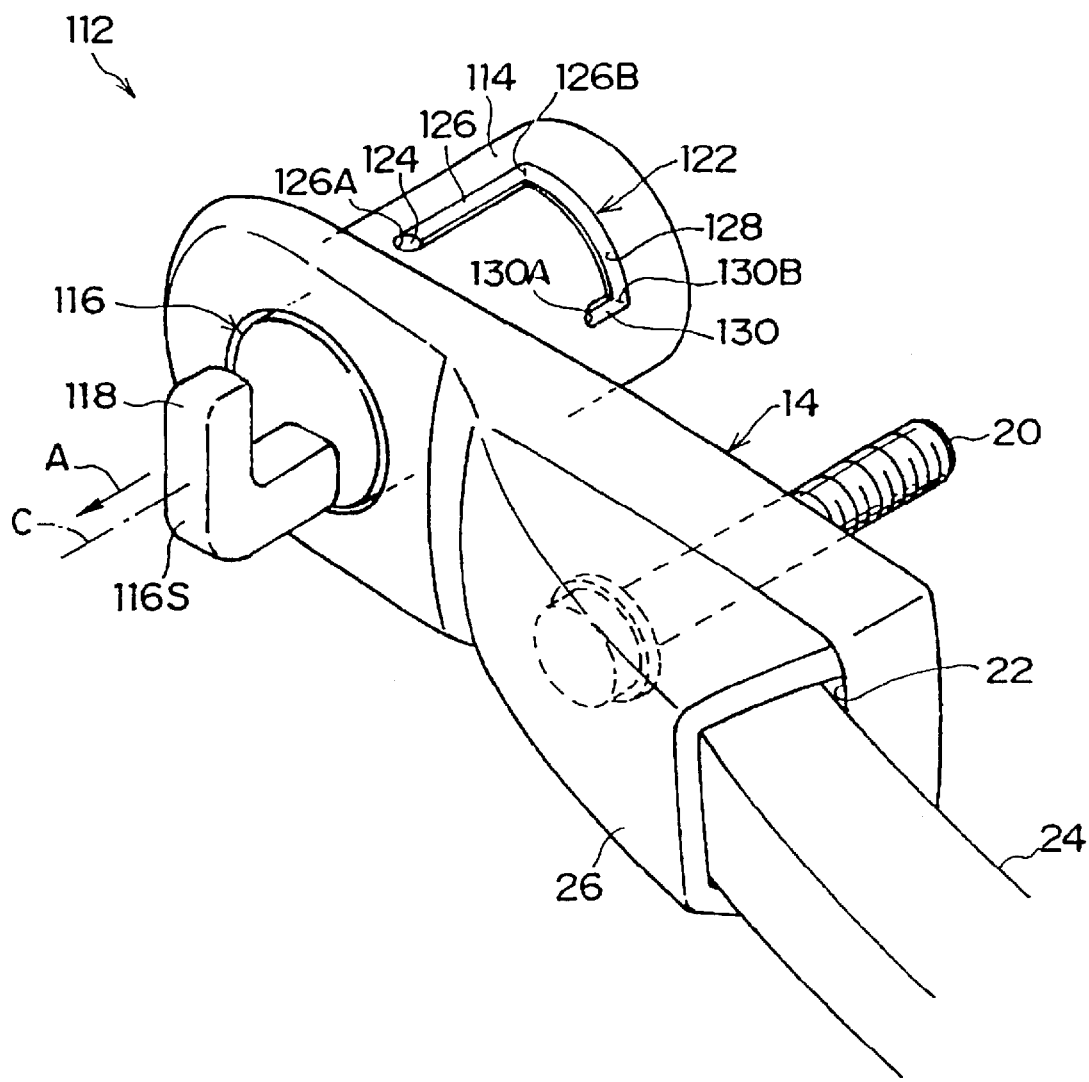
FIG. 12 is a partial perspective view showing the assist grip of the third embodiment according to the present invention, wherein the hook member is located at the using position.

FIGS. 11 and 12 are perspective views of an assist grip 112 of a third embodiment according to the present invention. The entire structure and structure to be attached to the car body of the assist grip 112 according to the third embodiment are the same as those of the assist grip 12 of the first embodiment. In the third embodiment, the same constituent elements and members as those of the first embodiment are represented by the same symbols, and explanations thereof are omitted.

In the assist grip 112 of the third embodiment, a housing 114 of the attaching member 14 is formed in a cylindrical shape and, corresponding thereto, a hook member 116 is substantially formed in a cylindrical shape or columnar shape. Therefore, the hook member 116 slides in the housing 114 in the arrow A direction and in the direction opposite thereto and, at the same time, is rotatable around a central line C.

A compressed coil spring 36 (not shown in FIGS. 11 and 12; refer to FIGS. 3, 5 and 6) is disposed between the hook member 116 and the housing 114 to thereby urge the hook member 116 in the arrow A direction, as in the assist grip 12 of the first embodiment.

Also, when compared with the first embodiment, both sides of the hanging portion 118 are notched, so that substantially semi-circular spaces 120 are formed between the hanging portion 118 and the inner surface of the housing 114, respectively. As can be seen from FIG. 11, even in case the hook member 116 is housed in the housing 114, the hook member 116 can be easily slid or rotated by inserting fingers into the spaces 120.

The housing 114 is provided with a cam groove 122 passing through a side wall thereof. On the one hand, a cam pin 124 entering the cam groove 122 is projected from the hook member 116. The cam groove 122 is formed of a sliding portion 126 disposed in the axial direction (in the direction parallel to the center line C) of the hook member 116; a rotating portion 128 connected to the sliding portion 126 on the rear end 126B side of the sliding portion 126 and provided along the periphery of the hook member 116; and an engaging portion 130 connected to the rotating portion 128 and disposed in the same direction as that of the sliding portion 126. The length of the engaging portion 130 is shorter than that of the sliding portion 126.

When the cam pin 124 is positioned in the sliding portion 126, the hook member 116 is slid in the housing 114. Then, as shown in FIG. 12, in a state where the cam pin 124 reaches the forward end 126A of the sliding portion 126, the hook member 116 is located in the using position and the holding portion 118 projects from the outer surface of the attaching member 14. At this time, the hanging portion 118 stands upright so that a member to be hung, such as a hanger 42, can be hung thereon (refer to FIGS. 2 and 4). Also, since the hook member 116 is urged by the compressed coil spring 36, the cam pin 124 is pressed against the forward end 126A of the sliding portion 126 and the hook member 116 is fixed at the using position.

When the cam pin 124 is positioned in the sliding portion 126, the hook member 116 is slid in the housing 114. Then, as shown in FIG. 12, in a state where the cam pin 124 reaches the forward end 126A of the sliding portion 126, the hook member 116 is located in the using position and the engaging piece 118 projects from the outer surface 14S of the attaching member 14. At this time, the hanging piece 118 stands upright so that a member to be hung, such as a hanger 42, can be hung thereon (refer to FIGS. 2 and 4). Also, since the hook member 116 is urged by the compressed coil spring 36, the cam pin 124 is pressed against the forward end 126A of the sliding portion 126 and the hook member 116 is fixed at the using position.

When the hook member 116 is pushed against the urging force of the compressed coil spring 36 so that the hook member 116 is pushed into the housing 114, the cam pin 124 reaches the rear end 126B of the sliding portion 126. Under the state, the hook member 116 is completely housed in the housing 114, so that the hook member 116 does not project from the outer surface 14S of the attaching member 14.

When the cam pin 124 is positioned at the rear end 126B of the sliding portion 126, the hook member 116 can be rotated. Through the rotation, the cam pin 124 is moved in the rotating portion 128 and reaches the rear end 130B of the engaging portion 130. Under the state, since the cam pin 124 is moved toward the forward end 130A in the engaging portion 130, the hook member 116 is also slightly moved in the arrow A direction. Therefore, when the pressing force of the hook member 116 is released, the hook member 116 is moved in the arrow A direction in receipt of the urging force of the compressed coil spring 36 and is stopped when the cam pin 124 reaches the forward end 130A of the engaging portion 130. At this time, the end surface 116S of the hook member 116 is aligned with the outer surface of the attaching member 14, so that the hook member 116 is located at the non-using position. At the non-using position, since the cam pin 124 is pressed against the forward end 130A of the engaging portion 130 by the urging force of the compressed coil spring 36, the hook member 116 is fixed at the non-using position.

As described hereinabove, also, in the assist grip 112 of the third embodiment, since the hook member 116 is moved between the using position and the non-using position by only sliding and rotating thereof, the assist grip 112 has good operability. Also, in the non-using position, the hook member 116 does not project from the attaching member so that it does not become an obstacle and its appearance looks better. Further, since the hook member 116 is fixed at the non-using position, there is no problem of making wobbling and unusual sound.

Figure 13:
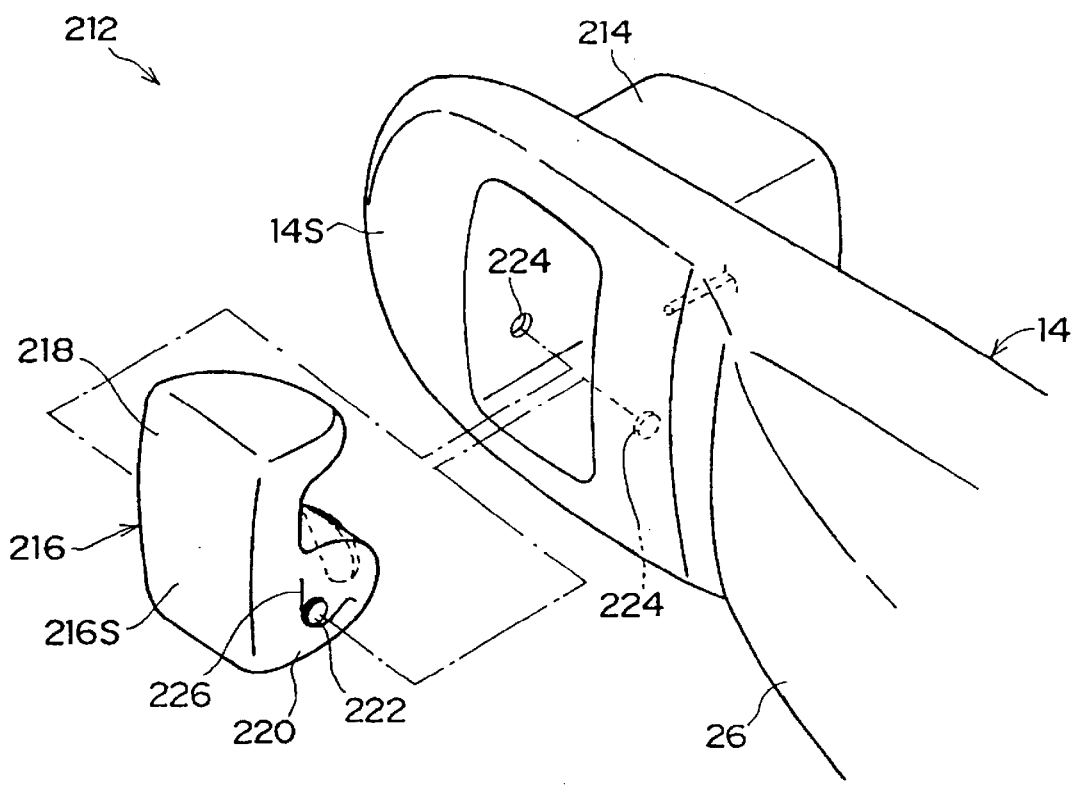
FIG. 13 is a partial exploded perspective view showing an assist grip of the fourth embodiment according to the present invention.
Figure 14:
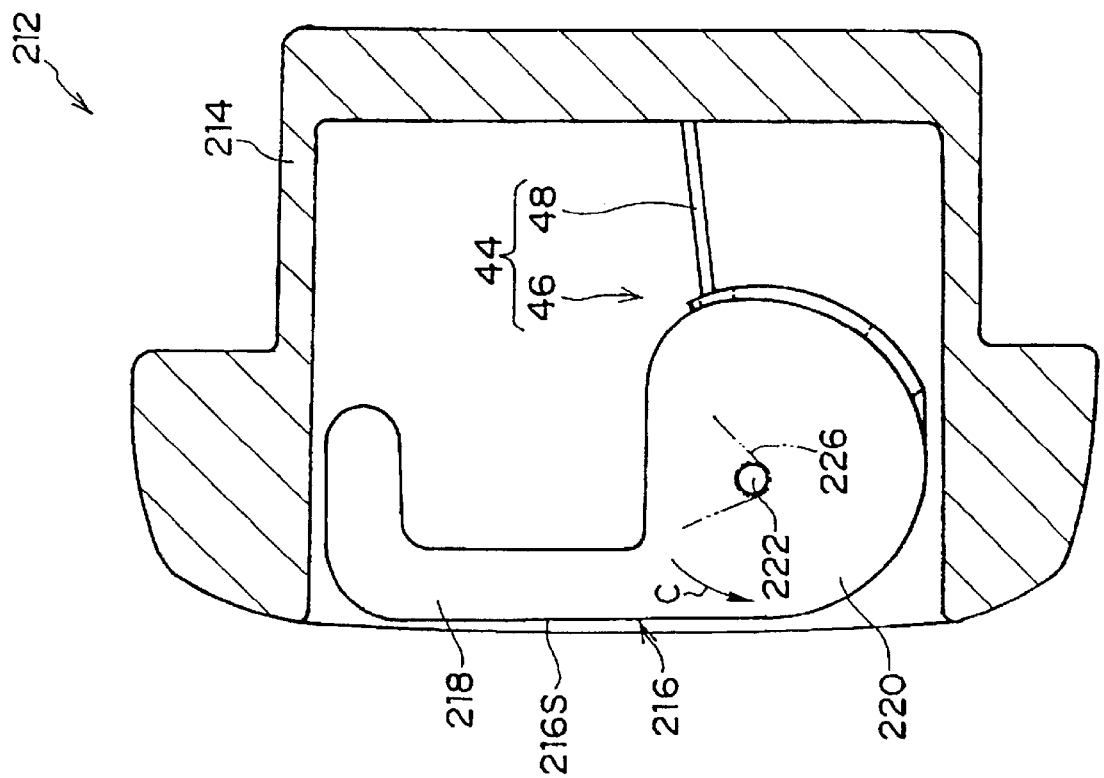
FIG. 14 is a partial sectional view of the assist grip of the fourth embodiment according to the present invention, wherein a hook member is located at the non-using position.
Figure 15:
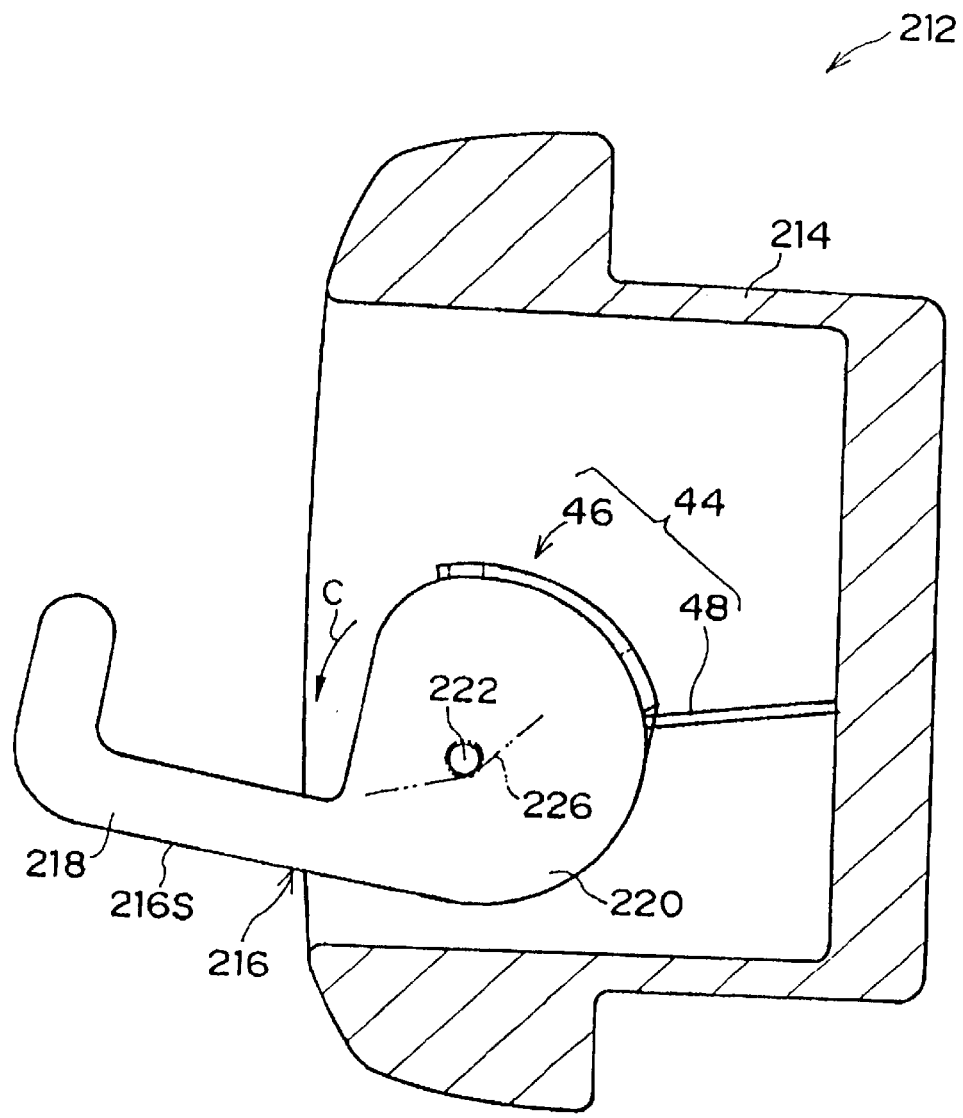
FIG. 15 is a partial sectional view of the assist grip of the fourth embodiment according to the present invention, wherein the hook member is located at the using position.
Figure 16:
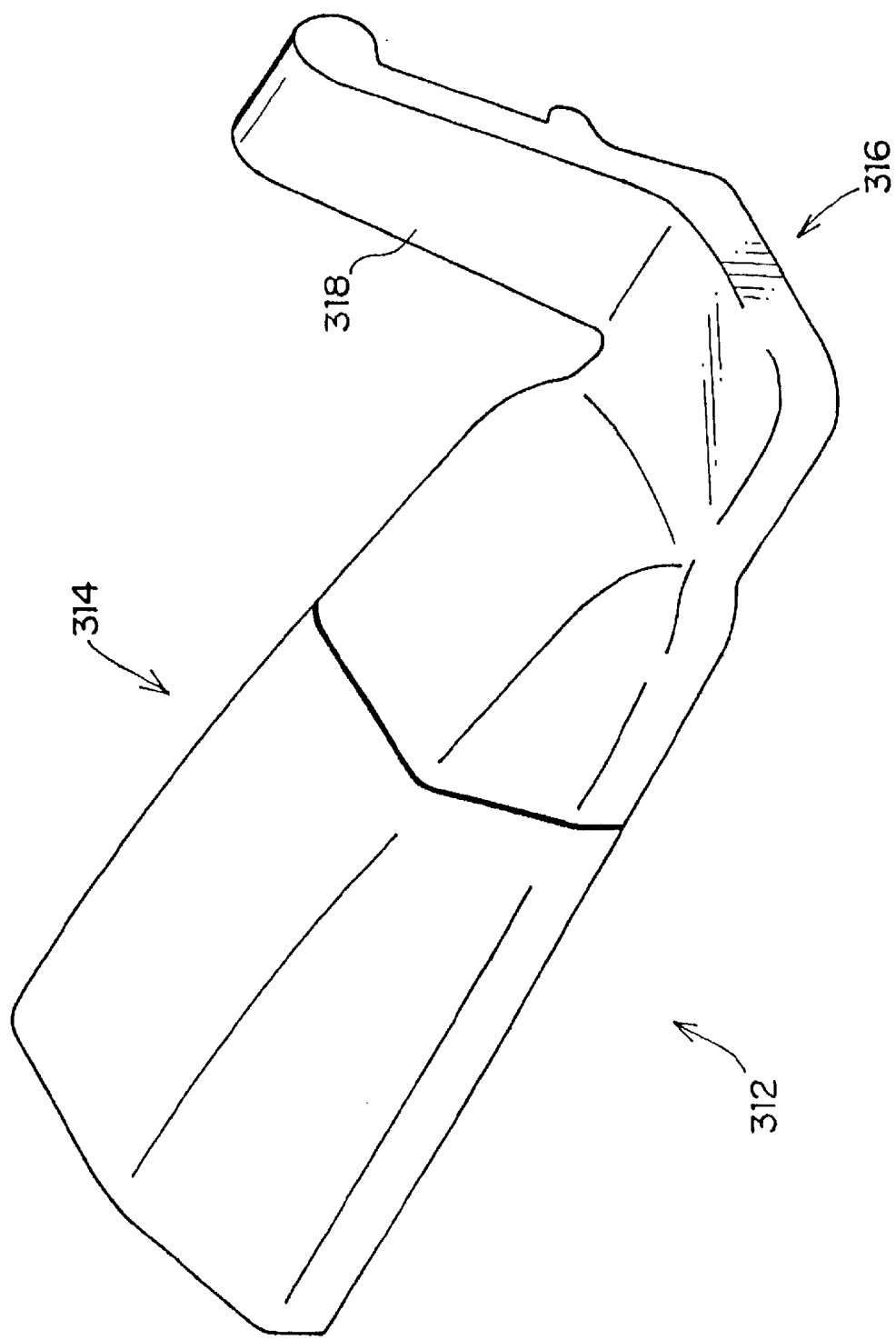
FIG. 16 is a partial perspective view of a conventional assist grip.
Figure 17B:
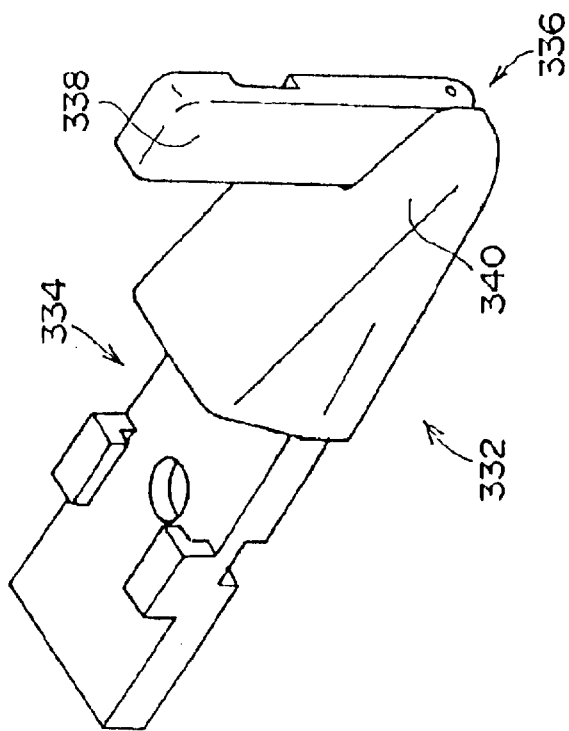
Figure 17A:
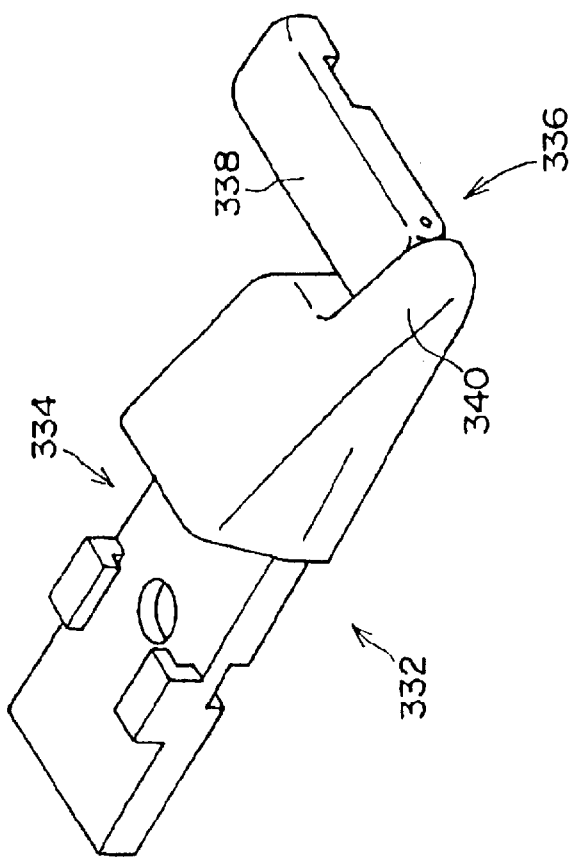

FIGS. 13–15 show an assist grip 212 of the fourth embodiment according to the present invention. The overall structure and the structure to be attached to a car body of the assist grip 212 according to the fourth embodiment are the same as those of the assist grip 12 of the first embodiment. In the fourth embodiment, also, the same constituent elements and members as those of the first embodiment are represented by the same symbols and explanations thereof are omitted.

A housing 214 in the assist grip 212 of the fourth embodiment is formed in an elongated square shape with a bottom.

Also, a hook member 216 includes a hanging portion 218 at an upper portion thereof, and a block portion 220 at a lower portion thereof. A pair of supporting shafts 222 projects from the block portion 220 in substantially the same direction as the front-and-rear direction of an automobile, and is inserted into shaft holes 224 of the housing 214. Therefore, the hook member 216 can be rotated around the supporting shafts 222 between a state wherein an end surface 216S is substantially aligned with the outer surface 14S of the attaching member 14 as shown in FIG. 14, and a state wherein an upper portion of the hook member 216 projects from the outer surface 14S of the attaching member 14 as shown in FIG. 15.

As can be seen from FIGS. 14 and 15, the block portion 220 is formed in substantially a semi-circular cylindrical shape with respect to the supporting shafts 222 as a center, and a hart cam 46 is formed on a peripheral surface thereof in the same manner as in the first embodiment. Also, a cam pin 48 corresponding to the hart cam 46 projects from the housing 214.

A twisted coil spring 226 is disposed on the supporting shaft 222 to urge the hook member 216 to project from the attaching member 14, i.e. in an arrow C direction.

In the assist grip 212 of the fourth embodiment as described above, as shown in FIG. 14, when the hook member 216 is located in the non-using position, the end surface 216S is substantially aligned with the outer surface 14S of the attaching member 14. Therefore, the hook member 216 does not project from the attaching member 14, so that it does not become an obstacle and its appearance looks better. Also, under this state, in the same manner as in the first embodiment, since the cam pin 48 is positioned at the engaging portion 46D of the hart cam 46 (refer to FIG. 7(D)), the hook member 216 is fixed at the non-using position to thereby make no wobbling nor unusual sound.

In case the hook member 216 is used, when the upper portion of the hook member 216 is pushed against the urging force of the twisted coil spring 226, engagement between the hart cam 46 and the cam pin 48 is released and the hook member 216 is rotated by the urging force of the twisted coil spring 226 to thereby assume the using position as shown in FIG. 15. Under the state, since the upper portion, i.e. the hanging portion 218, of the hook member 216 is projected from the attaching member 14, a member to be hung, such as a hanger, 42 can be hung on the hanging portion 218.

In case the hook member 216 is not used, the upper portion (a portion near the projecting end projected from the attaching member 14) of the hook member 216 is pushed against the urging force of the twisted coil spring 226 to rotate the hook member 216 in the direction opposite to the arrow C. When the hook member 216 assumes the non-using position as shown in FIG. 14, the cam pin 48 engages the engaging portion 46D of the hart cam 46 (refer to FIG. 7(D)) to thereby fix the hook member 216.

As described hereinabove, in the assist grip 212 of the fourth embodiment, also, when the hook member 216 is moved between its using position and non-using position, it is sufficient that the hook member 216 is simply rotated. Thus, the assist grip 212 has good operability. Also, the hook member 216 does not project from the attaching member 14 in its non-using state to thereby not become an obstacle and to make its appearance look better. Further, the hook member 216 is fixed in its non-using state, so that wobbling is not made nor unusual sound is generated.

Incidentally, in the above explanations, although the attaching member 14 and the housing 28, 114 or 214 are integrally formed, it is not always necessary that they are formed integrally. For example, the respective members may be formed separately and integrated at a later-process. As in the respective embodiments, according to the present invention, in case the attaching member and the housing are formed integrally, it is preferable that the strength as a whole is increased and the integrated unit can be firmly attached to the car body by only one piece of the attaching bolt 20.

In the present invention, the assist grip 12, 52, 112 or 212 integrated with the hook member 30, 116 or 216 can be structured by providing the hook member 30, 116 or 216 to the attaching member 14. In other words, it is possible to provide the assist grip and the hook in a compartment of an automobile without increase in the number of parts.

The hanging member of the present invention is not limited to the hook member 30, 116 or 216, and any hanging member where the member to be hung can be hung may be used. For example, the hanging member may have an insertion hole so that an upper part (a curved portion in a shape of hook) of a hanger is inserted into the insertion hole from its forward end; or the hanging member may have a depressed portion into which the upper part of the hanger is hung.

It is sufficient that the fixing device according to the invention is structured such that the hook member 30, 116 or 216 is fixed to the attaching member 14 at the non-using position. Therefore, for example, there may be considered such a structure that in the assist grip 12 of the first embodiment, the hart cam 46 is formed in the housing 28 and the cam pin 48 projects from the hook member 30.

The present invention having the above-described structure does not become an obstacle when it is not used and has a good outer appearance and good operability.

While the invention has been explained with reference to the specific examples of the invention, the explanation is illustrative and the invention is limited only by the appended claims.

What is claimed is:

1. An assist grip comprising:

an attaching device to be attached to a car body for supporting a grip main portion:

a housing integrated with the attaching device, and having at least one slit;

a hanging member disposed in the housing attached to the attaching device to be movable between a using position projected from the attaching device and a non-using position retreated from the using position with respect to the attaching device for allowing a member to be hung at the using position, said hanging member having a guiding member formed at one side thereof and engaging the slit so that the guiding member in the slit limits a movement of the hanging member between the using position and the non-using position; and a fixing device situated between the housing and the hanging member for releasably fixing the hanging member to the attaching device at the non-using position.

2. An assist grip as claimed in claim 1, wherein said hanging member slides with respect to the attaching device so that said hanging member is moved between the using position and the non-using position.

3. An assist grip as claimed in claim 1, wherein said fixing device allows said hanging member to be fixed relative to the attaching device or allows said hanging member to be released therefrom through a movement of the hanging member toward the non-using position.

4. An assist grip as claimed in claim 1, further comprising a spring attached to the hanging member for urging the hanging member to the using position.

5. An assist grip as claimed in claim 1, wherein said at least one slit includes a horizontal portion and a front end inclined upwardly from the horizontal portion to incline the hanging member at the using position.

6. An assist grip as claimed in claim 1, wherein said at least one slit includes a sliding portion disposed in an axial direction of the housing, a rotating portion connected to the sliding portion at a rear end thereof and provided along a periphery of the housing, and an engaging portion connected to the rotating portion and disposed in a same direction as that of the sliding portion.

7. An assist grip as claimed in claim 1, wherein said fixing device is a cam, a cam pin engaging the cam, and a spring for urging the cam pin toward the cam.

* * * * *